(12) United States Patent
Postolek

(10) Patent No.: US 11,425,986 B2
(45) Date of Patent: Aug. 30, 2022

(54) HARD SHELL MODULAR LIGHTWEIGHT LOAD-CARRYING EQUIPMENT SYSTEM AND METHOD OF MAKING THEREOF

(71) Applicant: Civilian Lab LLC, Long Beach, CA (US)

(72) Inventor: Filip Postolek, Long Beach, CA (US)

(73) Assignee: CIVILIAN LAB LLC, Long Beach, CA (US)

( * ) Notice: Subject to any disclaimer, the term of this patent is extended or adjusted under 35 U.S.C. 154(b) by 705 days.

(21) Appl. No.: 15/877,260

(22) Filed: Jan. 22, 2018

(65) Prior Publication Data
US 2019/0223579 A1     Jul. 25, 2019

(51) Int. Cl.
| | |
|---|---|
| *A45F 3/04* | (2006.01) |
| *B65D 25/20* | (2006.01) |
| *A45C 5/06* | (2006.01) |
| *B60R 11/00* | (2006.01) |
| *A45C 5/03* | (2006.01) |
| *A45C 13/30* | (2006.01) |

(52) U.S. Cl.
CPC .................. *A45F 3/04* (2013.01); *A45C 5/06* (2013.01); *B65D 25/20* (2013.01); *A45C 2005/037* (2013.01); *A45C 2013/306* (2013.01); *B60R 11/00* (2013.01); *B60R 2011/0071* (2013.01); *B60R 2011/0075* (2013.01)

(58) Field of Classification Search
CPC ........ A45F 3/04; A45F 3/06; A45F 2003/001; B60R 11/00; B60R 2011/0071; B60R 2011/0075; F41C 33/041; Y10T 24/45089; B65D 25/20; A45C 2013/306; A45C 2005/037; A45C 5/06
USPC ........................................ 224/650, 651, 652
See application file for complete search history.

(56) References Cited

U.S. PATENT DOCUMENTS

| | | | |
|---|---|---|---|
| 7,526,842 B2* | 5/2009 | Wemmer | A41D 27/20 24/578.13 |
| 2013/0047386 A1* | 2/2013 | Barfoot | A47F 5/0006 24/580.1 |

* cited by examiner

*Primary Examiner* — Nathan J Newhouse
*Assistant Examiner* — Matthew T Theis
(74) *Attorney, Agent, or Firm* — Dickinson Wright PLLC; Andrew D. Dorisio

(57) ABSTRACT

The present disclosure relates to an improved Modular Lightweight Load-carrying Equipment (MOLLE) system that employs hard-shells and a method of making thereof. The disclosed hard-shell MOLLE system not only provides better durability for the MOLLE system, but also allows the MOLLE system to apply on hard objects such as thermo-formed/molded backpacks, bags, vehicle panels and containers etc.

20 Claims, 4 Drawing Sheets

HARD SHELL MODULAR LIGHTWEIGHT LOAD-CARRYING EQUIPMENT SYSTEM AND METHOD OF MAKING THEREOF

FIELD OF THE DISCLOSURE

The present disclosure generally relates to Modular Lightweight Load-carrying Equipment (MOLLE) system. More specifically, the present disclosure discloses a method of creating hard-shell MOLLE system that can be applied on anything that employs MOLLE system such as military backpacks, vests and quad vehicles. The present disclosure further discloses an exemplary backpack that employs the disclosed hard-shell MOLLE system.

BACKGROUND OF THE INVENTION

Modular Lightweight Load-carrying Equipment (MOLLE) system refers to the current generation of load-bearing equipment and backpacks used by a number of NATO armed forces including the United States Army. As shown by FIG. 1, conventional MOLLE systems employ Pouch Attachment Ladder System (PALS) webbing 2 as rows of heavy-duty nylon stitched onto the military backpacks, bags, vests and similar sewn products to allow for the attachment of various compatible pouches and accessories such as various sizes of magazines, knives, water bottle etc. This method of attachment has become a de facto standard for modular tactical gear.

The present disclosure discloses an improved MOLLE system using hard-shells and a method of making thereof, which not only increases the durability of the MOLLE system, but also allows the MOLLE system to be used on hard objects such as thermoformed/molded backpacks, bags, vehicle panels, containers etc.

SUMMARY OF THE INVENTION

One objective of the present disclosure is to provide an improved MOLLE system that allows the MOLLE system to be applied on hard objects and a method of making thereof. Another objective of the present disclosure is to provide an improved MOPLLE system that has a better durability and has the capability to load and carry more accessory and equipment.

In accordance with one embodiment of the present disclosure, a method of employing MOLLE system on a surface of a hard object is disclosed. The method comprises: 1) creating a plurality of depressed channels on a surface of a hard object in parallel to create a plurality of vertical canals, wherein distance between each vertical canal and its adjacent vertical canal is same; 2) placing a plurality of cross members made of a hard material across the plurality of vertical canals in parallel, wherein the plurality of cross members is perpendicular to the plurality of vertical canals, forming a grid; and 3) fixing the plurality of cross members to the surface of the hard object with screws or rivets.

In other words, the present disclosure works by creating depressed channels in the molded material when formed that establish vertical canals for the users' fingers to pass and for the pouch mounting-straps, or other hardware to pass. The second part of the disclosed system is to have cross members to pass over them at 90 degrees forming the traditional grid pattern. The cross members may be rigid such as polymer sheets, molded plastic parts, or webbing. They can be fixed with hardware such as screws/rivets or sewn. If made of plastics, the cross members have the added utility of being able to have perforations making them capable of accepting screws and attaching items like lights, knife sheaths and camera equipment like action cameras. This would not be possible in the traditional webbing because putting holes in the nylon webbing would damage it, and there is no way to access the back since they are on a flat fabric surface without the channels in the back. The molded mounting surface may further comprise molded depressions that guide the placement of the cross-members and prevent their lateral movement. This makes assembly easier for the worker and necessitates only 3rd dimension staking at the rivet/sewing points.

These and other features, aspects and advantages of the present invention will become better understood with reference to the following drawings, description and claims.

DETAILED DESCRIPTION OF THE PREFERRED EMBODIMENT(S) AND INVENTION

The following description is not to be taken in a limiting sense, but is made merely for the purpose of illustrating the general principles of the disclosure, since the scope of the disclosure is best defined by the following claims. Various inventive features are described below that can each be used independently of one another or in combination with other features.

Figure 1:
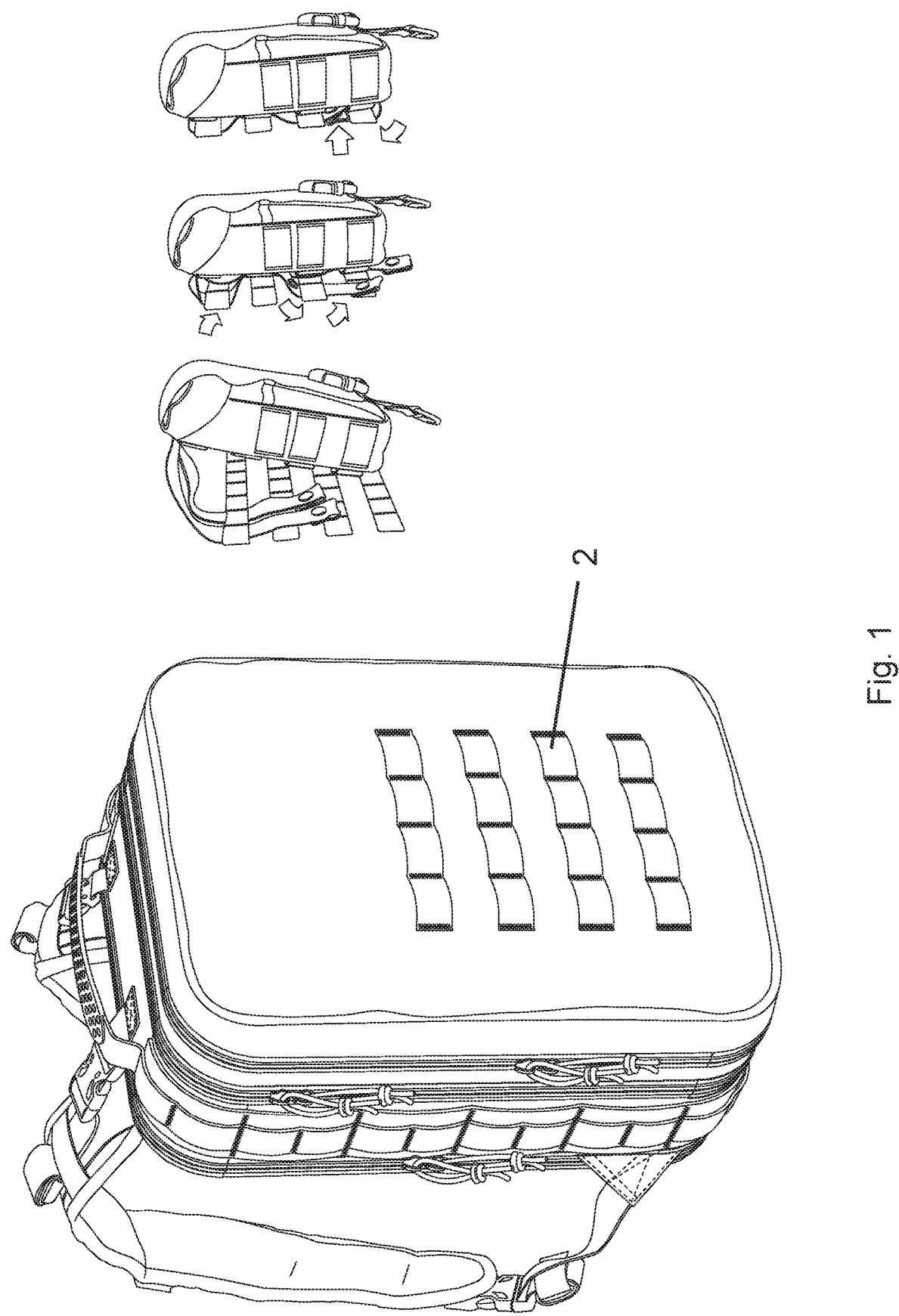
FIG. 1 is a schematic diagram showing traditional MOLLE systems with PALS webbing.
Figure 2:
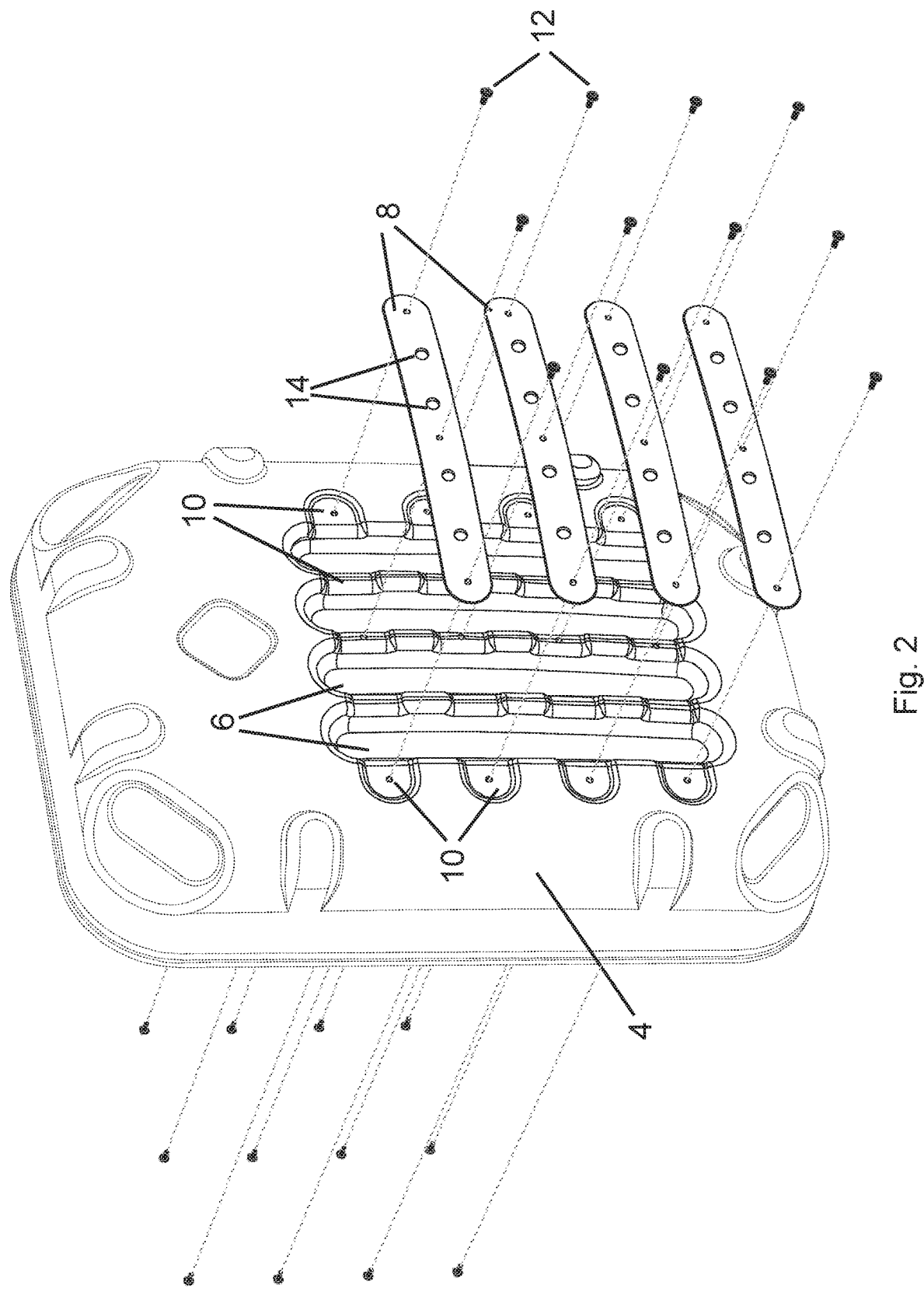
FIG. 2 is a schematic diagram according to an exemplary embodiment of the present invention.

Broadly, embodiments of the present disclosure generally relate to a hard-shell Modular Lightweight Load-carrying Equipment (MOLLE) system and a method of making thereof. In one embodiment, as shown by FIG. 2, a method of employing MOLLE system on a surface of a hard object is disclosed, the method comprises: creating a plurality of depressed channels on a surface of a hard object 4 such as a thermoformed or molded backpack in parallel to create a plurality of vertical canals 6, wherein distance between each vertical canal 6 and its adjacent vertical canal 6 is the same; placing a plurality of cross members 8, preferably made of a hard material, across the plurality of vertical canals 6 in parallel, wherein the plurality of cross members 8 is perpendicular to (e.g., 90 degrees) the plurality of vertical canals 6, forming a grid; and fixing the plurality of cross members 8 to the surface of the hard object 4. Note that the disclosed method can be applied on surface of any hard object such as a hard-shell bag, a quad vehicle panel or a container and is not limited to thermoformed or molded backpack. The hard object may include, but is not limited to, things made of plastic, metal, fiberglass, wood, glass or combination thereof. The cross members 8 may be rigid such as polymer sheets, molded plastic parts, metal or webbing, where they can be fixed to the hard object with hardware such as screws/rivets 12 or sewn. Preferably, dimensions of the vertical canals 6, especially the width and depth, are configured in a way to allow a user's fingers to pass and for the pouch mounting-straps, or other common MOLLE hardware to pass.

In one embodiment, as shown by FIG. 2, the disclosed method further comprises creating a plurality of molded depressions 10 in parallel on the surface of the hard object 4 that are also perpendicular to and cross the plurality of vertical canals 6, wherein each molded depression 10 is configured to fit one crossing member 8. One advantage of making the molded depressions 10 is that they can serve as guides for the crossing member's 8 placement during assembly which makes assembly easier for the worker and necessitates only 3rd dimension staking at the rivet/sewing points. The molded depressions 10 also prevent lateral movement of the crossing members 8. The depth of the plurality of molded depressions 10 should be less than depth of the plurality of vertical canals 6 so a space is created between the vertical canals 6 and the cross members 8. Preferably, the shape of the plurality of molded depressions 10 should be designed to resemble the shape of the plurality of cross members 8, which can also increase the aesthetics aspect of the disclosed MOLLE system as shown by the figure.

Figure 4:
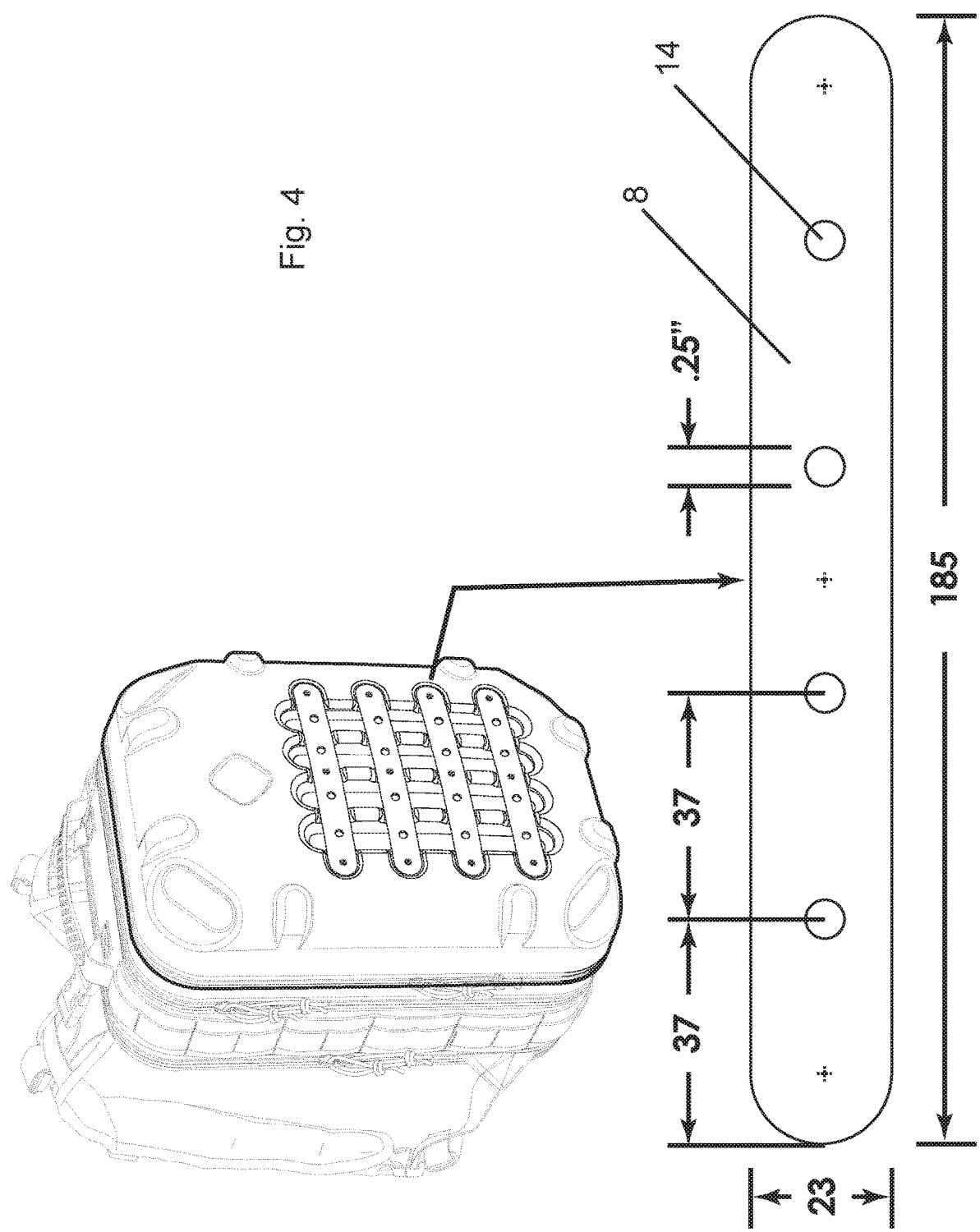
FIG. 4 is a schematic diagram according to an exemplary embodiment of the present invention.

In yet another embodiment of the present disclosure, the disclosed method further comprises perforating a plurality of holes 14 on the plurality of cross members 8. This is possible when the cross members 8 are also made of a hard material such as molded plastic, polymer sheet and/or metal. The plurality of holes 14 adds the utility of making the disclosed hard-shell MOLLE system capable of accepting screws and attaching items like lights, knife sheaths and camera equipment like action cameras. For instance, as shown by FIG. 4, each of the plurality of cross members 8 has holes with 0.25 inch in diameter. The holes can be used as screw holes for attaching various equipment such as camera or the camera mount. The size of holes can be customized by the user depending on the type of equipment the user intended to mount or attach to the cross members 8. This would not be possible in the traditional webbing because putting holes in the nylon webbing would damage it, and there is no way to access the back since they are on a flat fabric surface without the channels in the back.

The number of vertical canals 6 and cross members 8 may vary depending on the design and/or the surface size of the hard object 4, and it not limited to 4 by 4 grid as shown by the figures. For examples, there can be three vertical canals 6 with six cross members 8 (i.e., 3 by 6 grid), or six vertical canals 6 with five cross members 8 (i.e., 6 by 5 grid). While the length (i.e., the longer side) of the vertical canals 6 will vary depending on the design, the width of the vertical canal 6 preferably should be kept within 24 millimeter (mm) to 30 mm to create best performance. Similarly, while the length and thickness of the cross members 8 can vary depending on the design or size of the grid, the width of the cross member 8 should be kept within 21 mm to 30 mm.

In yet another embodiment of the present disclosure, the length for each crossing member 8 and/or molded depression 10 is configured in a way so that it is greater than the width of all vertical canals 6 combined, and length for each of the plurality of vertical canal 6 is also configured to exceed the width of all cross members 8 combined. This provides better performance for the disclosed hard-shell system and also increases its aesthetic appearance.

Figure 3:
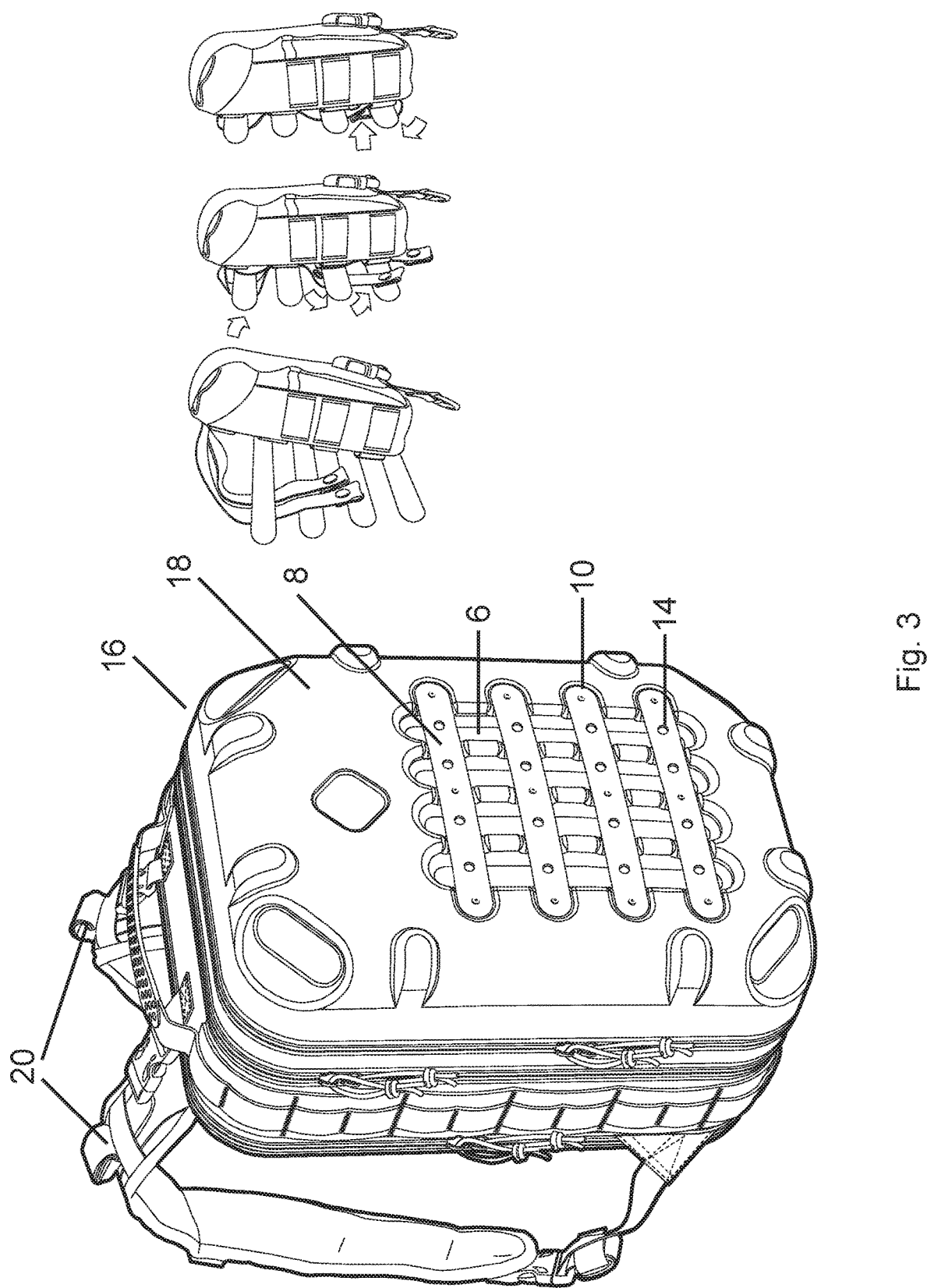
FIG. 3 is a schematic diagram according to an exemplary embodiment of the present invention.

In yet another embodiment of the present disclosure, as shown by FIG. 3, a backpack 16 employing the disclosed hard-shell MOLLE system is disclosed comprising a rigid outer shell 18 and at least one flexible shoulder strap 20, preferably two, for securing the rigid outer shell 18 to a user. The rigid outer shell 18 further comprises a plurality of vertical canals 6 aligned in parallel, where distance between each vertical canal 6 and its adjacent vertical canal 6 is same; and a plurality of cross members 8 made of a hard material (e.g., polymer sheets, molded plastic parts, metal etc.) which are placed across the plurality of vertical canals 6 in parallel and is perpendicular to the plurality of vertical canals 6 forming a grid. The plurality of cross members 8 is fixed to the rigid outer shell 18 through an attaching mean such as using screw/rivet, glue, or sewn. The number of vertical canals 6 and cross members 8 can vary depending on the design or the size of the backpack 16. For example, it can be a 4 by 4 grid as shown by the figure. The cross members 8 may further comprise a plurality of holes 14 so they are capable of accepting screws and attaching items like lights, knife sheaths and camera equipment like action cameras.

In one embodiment, the rigid outer shell 18 of the backpack 16 further comprises a plurality of molded depressions 10 aligned in parallel that are perpendicular to and cross the plurality of vertical canals 6 forming a grid, where depth of the plurality of molded depressions 10 is less than depth of the plurality of vertical canals 6. Preferably, the shape of the plurality of molded depressions 10 should be designed to resemble the shape of the plurality of cross members 8, which can also increase the aesthetics aspect of the disclosed MOLLE system as shown by FIG. 3.

For optimal performance and appearance, it is suggested that the length for each crossing member 8 and/or molded depression 10 is configured to be greater than the width of all vertical canals 6 combined, and length for each of the plurality of vertical canal is also configured to exceed the width of all cross members 8 combined. Further, the width of the vertical canal 6 preferably should be kept within 24 millimeter (mm) to 30 mm and the width of the cross member 8 should be kept within 21 mm to 30 mm. FIG. 4 shows an exemplary dimension in millimeters for a cross member 8 of a 4 by 4 grid (e.g., four vertical canals with four cross members) with holes 14.

In yet another embodiment, the interior of the backpack is different than the outside (i.e., the rigid outer shell). In other word, the interior of the molded section of the molding is different than on the outside so as to form counter-sunk holes for the rivets/screws to live in without scratching the contents of the backpack.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A method of employing MOLLE system on a surface of a hard object, the method comprises:

creating a plurality of depressed channels on a surface of a hard object in parallel to create a plurality of vertical canals, wherein distance between each vertical canal and its adjacent vertical canal is same;

placing a plurality of cross members made of a hard material across the plurality of vertical canals in parallel, wherein the plurality of cross members is perpendicular to the plurality of vertical canals, forming a grid; and fixing the plurality of cross members to the surface of the hard object with screws or rivets.

2. The method of claim 1, wherein the hard object is a thermoformed or molded backpack, a hard-shell bag, a vehicle panel or a container.

3. The method of claim 1, wherein each of the plurality of vertical canals has a width of 24 millimeter (mm) to 30 mm.

4. The method of claim 1 further comprising creating a plurality of molded depressions in parallel on the surface of the hard object that are perpendicular to and cross the plurality of vertical canals, wherein each molded depression is configured to fit one crossing member and guide the crossing member's placement.

5. The method of claim 4, wherein depth of the plurality of molded depressions is less than depth of the plurality of vertical canals.

6. The method of claim 4, wherein the plurality of molded depressions' shape resembles the plurality of cross members' shape.

7. The method of claim 1 further comprising perforating a plurality of holes on the plurality of cross members.

8. The method of claim 1, wherein each of the plurality of the cross member has a width of 21 mm to 26 mm.

9. The method of claim 1, wherein the hard material is polymer sheet, metal or plastic.

10. The method of claim 1, wherein length for each of the plurality of crossing members is greater than total combined width of the plurality of vertical canals, and length for each of the plurality of vertical canal is greater than total combined width of the plurality of crossing members.

11. A method of employing MOLLE system on a surface of a hard object, the method comprises:

creating a plurality of depressed channels on a surface of a hard object in parallel to create a plurality of vertical canals, wherein distance between each vertical canal and its adjacent vertical canal is same;

creating a plurality of molded depressions in parallel on the surface of the hard object that are perpendicular to and cross the plurality of vertical canals to form a grid, wherein depth of the plurality of molded depressions is less than depth of the plurality of vertical canals;

placing a plurality of cross members made of polymer sheet, metal or plastic into the plurality of molded depressions where each molded depression is configured to fit one crossing member, wherein the plurality of cross members is perpendicular to the plurality of vertical canals;

wherein length for each of the plurality of crossing members is greater than total combined width of the plurality of vertical canals, and length for each of the plurality of vertical canal is greater than total combined width of the plurality of crossing members; and fixing the plurality of cross members to the surface of the hard object with screws or rivets.

12. The method of claim 11, wherein the plurality of molded depressions' shape resembles the plurality of cross members' shape.

13. The method of claim 11 further comprising perforating a plurality of holes on the plurality of cross members.

14. The method of claim 11, wherein each of the plurality of the cross member has a width of 21 to 26 mm and each of the plurality of vertical canals has a width of 24-30 mm.

15. A backpack comprising:

a rigid outer shell that comprises:
  a plurality of vertical canals aligned in parallel, where distance between each vertical canal and its adjacent vertical canal is same;
  a plurality of cross members made of a hard material, where the plurality of cross members is placed across the plurality of vertical canals in parallel and is perpendicular to the plurality of vertical canals forming a grid;
  wherein the plurality of cross members is fixed to the rigid outer shell through an attaching mean;
  wherein length for each of the plurality of crossing members is greater than total combined width of the plurality of vertical canals, and length for each of the plurality of vertical canal is greater than total combined width of the plurality of crossing members; and at least one flexible shoulder strap for securing the rigid outer shell to a user.

16. The backpack of claim 15, wherein the rigid outer shell further comprises a plurality of molded depressions aligned in parallel that are perpendicular to and cross the plurality of vertical canals forming a grid, where depth of the plurality of molded depressions is less than depth of the plurality of vertical canals.

17. The backpack of claim 16, wherein the plurality of molded depressions' shape is configured to resemble the plurality of cross members' shape, and the plurality of cross members are placed within the plurality of molded depressions so that each cross member is configured to fit one molded depression.

18. The backpack of claim 15, wherein all cross members have a plurality of holes.

19. The backpack of claim 15, wherein each of the plurality of the cross member has a width of 21 to 26 mm and each of the plurality of vertical canals has a width of 24 to 30 mm.

20. The backpack of claim 15, wherein the rigid outer shell comprises four vertical canals and four cross members.

* * * * *